Patented Aug. 21, 1928.

1,681,497

UNITED STATES PATENT OFFICE.

CHESTER L. READ, OF RAHWAY, AND BERRY MARVEL O'HARRA, OF WESTFIELD, NEW JERSEY, ASSIGNORS TO AMERICAN SMELTING AND REFINING COMPANY, OF NEW YORK, N. Y., A CORPORATION OF NEW JERSEY.

PROCESS FOR PURIFYING SODIUM STANNATE SOLUTION.

No Drawing.   Application filed July 3, 1926.   Serial No. 120,520.

This invention relates generally to the treatment of alkali-metal stannate solutions for the removal of deleterious substances, and more particularly, relates to a process for separating lead, copper, antimony, selenium, tellurium and similar metals from such solutions.

The solution to be treated may be derived from any process in which alkali-metal stannates are produced, such as the refining of lead by treatment with caustic soda and sodium nitrate. Such solutions usually contain, in addition to the stannates, salts of other metals such as lead, copper and similar metals and of antimony selenium and tellurium, which are the cause of great difficulties in the treatment of the solution to recover the tin, making it impossible to secure firm, adherent, non-spongy deposits of tin by the electrolytic process, as a result of which large amounts of the deposited tin are oxidized and wasted in melting down.

By the present invention a method is provided for the removal of these impurities which is simple in operation, economical in practice, and which may be carried out with inexpensive equipment.

By this invention it is possible to enrich the solution in tin to an extent equivalent to a portion of the impurity metals removed, and to promote the recovery of the tin in a highly purified state and of the best quality.

The recovery of by-products which would otherwise be lost, and which may be converted into useful and marketable products by suitable treatment, is made possible by this invention.

The invention broadly consists in subjecting the alkali-metal stannate solution containing impurities to the action of an alkali sulphide and of tin in an oxidizable condition in sufficient quantities to precipitate the impurity metals from the solution.

In general the process consists in adding the purifying reagents to the solution, heating the mixture to suitable temperature and agitating or stirring it for a sufficient length of time to assure complete precipitation of the impurities in a form easily separable from the solution by filtration or other suitable means. The purified solution may then be electrolyzed, and firm, dense, non-spongy deposits of tin secured, which may be melted with practically no oxidation of the metal. The impurities, after removal from the solution, may also be subjected to suitable treatment to convert them into useful products.

The invention further consists in the new and novel features of operation and the new and original arrangements and combinations of steps in the process hereinafter described and more particularly set forth in the claims.

One method of practicing the invention is to add to the alkali-metal stannate solution a quantity of sodium sulphide, or other alkali sulphide, equivalent to the amount of lead, copper and similar metals present in the solution. The amount required may be determined by treating a measured quantity of the solution repeatedly with small measured quantities of the reagent until all of the above mentioned impurity metals have been precipitated, and other methods for determining the necessary amount of reagent will suggest themselves to those skilled in the art.

The solution and the necessary amount of alkali-metal sulphide may then be agitated or stirred together until all of the lead, copper, etc. are precipitated, one hour usually being ample time for this treatment. The solution may be cold during this treatment, but preferably it is heated to between 70 degrees C. and the boiling point, as by so doing the alkali sulphide not only precipitates the impurities mentioned above but also tends to reduce and render harmless any nitrates that may be present. The impurities precipitated by the alkali sulphide may, if desired, now be separated from the solution, as by filtration, but their presence will not interfere with the next step.

To the solution, still maintained at or heated to between 70 degrees C. and its boiling point, is added finely divided metallic tin or stannous chloride, or tin in an oxidizable condition in any desired form, and the stirring or agitation is continued. Under these conditions of temperature and agitation, the antimony, selenium and tellurium are displaced from the solution by the added tin, the solution thereby becoming enriched in tin to an equivalent extent. The agitation and addition of reagent may be repeated, if necessary, until all of the antimony, selenium and tellurium have been displaced from the solution as precipitates.

The precipitated impurities, including those precipitated in the first step if these have not already been removed, may now be separated from the solution. This may be accomplished by filtration, by settling and decantation, or by other means which are familiar to those skilled in the art. After separation, the precipitates may be subjected to further treatment to separate the constituent metals or to convert them into useful compounds.

The purified solution, while still hot, may be electrolyzed in the usual manner, and, owing to the absence of impurities which would harmfully affect this treatment, smooth, firm deposits of tin of extreme purity are readily obtained.

A modified method in which the invention may be practiced comprises adding the required amounts of alkali sulphide and tin or stannous chloride to the hot solution at one and the same time, and agitating the mixture until all of the impurities are removed. The action of one reagent has no harmful effect on the other. By this method the time required for the treatment is somewhat less than when the treatment is made in two steps.

By means of this process it is apparent that deleterious substances may be readily removed from alkali-metal stannate solutions, so that tin of extreme purity may be recovered from them. At the same time, by this process the solutions is enriched in tin, making the electrolyzing easier.

The absence of deleterious impurities during the electrolyzing makes it possible to collect the tin on the cathodes in smooth, dense deposits of considerable thickness, free from spongy or porous spots, and to melt the cathode deposits with no oxidation or drossing of the metal, thereby greatly increasing the amount of tin finally recovered in marketable form.

Only simple, well known apparatus is required. The operations are not complicated, nor are the reagents expensive; hence the process is economical to practice, making it possible to treat solutions of low grade which would otherwise be wasted or would have to be concentrated at considerable expense.

The impurity metals removed from the solution by this process may be separated from one another or given any desired subsequent treatment, and such treatment is facilitated by the fact that the metals may be separated from the solution in two groups during the treatment. Thus the lead and copper and similar metals precipitated by the alkali sulphide may be collected and treated separately from the selenium and tellurium.

Although we have shown and described and have pointed out in the annexed claims certain novel features of the invention, it will be understood that various omissions, substitutions and changes in the several steps of the process and in its operation may be made by those skilled in the art without departing from the spirit of the invention.

Having thus described our invention, we claim:

1. Process for purifying sodium stannate solutions containing lead, copper, antimony, selenium and tellurium, which consists in agitating the solution with sodium sulphide in amounts to precipitate the lead and copper, separating the precipitated lead and copper from the solution, heating and agitating the solution with tin in an oxidizable condition in amounts to precipitate the antimony, selenium and tellurium and separating the precipitated metals from the solution.

2. Process for removing impurities from sodium stannate solutions, which consists in adding sodium sulphide to the solution, agitating the mixture to precipitate lead and copper, separating the precipitated metals, adding tin in an oxidizable condition to the solution while heated to a temperature between 70 degrees C. and its boiling point and agitating to precipitate the antimony selenium and tellurium, and separating the precipitated metals from the solution.

3. In the purification of alkali-metal stannate solutions, the step of removing lead and copper by the action of sodium sulphide, then removing antimony selenium and tellurium by the action of tin in an oxidizable condition and heat, whereby the said lead and copper may be recovered separately from the said antimony selenium and tellurium.

4. Process for purifying alkali-metal stannate solutions, which consists in agitating the solution with alkali-metal sulphides, separating the precipitated impurities from the solution, heating the solution to a temperature between 70 degrees C. and its boiling point and agitating it with tin in an oxidizable condition, and separating the precipitated impurities.

5. Process for removing impurities from alkali-metal stannate solutions, which consists in adding alkali-metal sulphide to the solution, agitating the mixture to precipitate lead and copper, separating the precipitated metals, adding tin in an oxidizable condition to the solution, heating to a temperature near the boiling point and agitating to precipitate the antimony, selenium and tellurium, and separating the precipitated metals from the solution.

In testimony whereof we have hereunto set our hands.

CHESTER L. READ.
BERRY MARVEL O'HARRA.